(12) United States Patent
Just

(10) Patent No.: US 8,419,350 B2
(45) Date of Patent: Apr. 16, 2013

(54) EXHAUST-GAS TURBOCHARGER FOR AN INTERNAL COMBUSTION ENGINE

(75) Inventor: Michael Just, Kaiserslautern (DE)

(73) Assignee: Bosch Mahle Turbo Systems GmbH & Co. KG (DE)

( * ) Notice: Subject to any disclaimer, the term of this patent is extended or adjusted under 35 U.S.C. 154(b) by 735 days.

(21) Appl. No.: 12/554,357

(22) Filed: Sep. 4, 2009

(65) Prior Publication Data

US 2010/0135785 A1    Jun. 3, 2010

(30) Foreign Application Priority Data

Sep. 8, 2008  (DE) .......................... 10 2008 046 221

(51) Int. Cl.
*F04D 29/08*    (2006.01)

(52) U.S. Cl.
USPC ........................................................ 415/111

(58) Field of Classification Search .................. 416/174; 415/110, 111, 168.1, 168.2, 170.1, 174.5, 415/216.1, 229, 230
See application file for complete search history.

(56) References Cited

U.S. PATENT DOCUMENTS

| | | | | |
|---|---|---|---|---|
| 4,968,453 A | * | 11/1990 | Wada et al. ................... | 508/492 |
| 5,066,192 A | * | 11/1991 | Honda et al. .................. | 415/112 |
| 2006/0236694 A1 | * | 10/2006 | Aguilar ........................ | 60/605.1 |

* cited by examiner

*Primary Examiner* — Ninh H Nguyen
*Assistant Examiner* — Adam W Brown
(74) *Attorney, Agent, or Firm* — Rader, Fishman & Grauer PLLC

(57) ABSTRACT

An exhaust-gas turbocharger for an internal combustion engine is described herein, in particular for a motor vehicle. An exhaust-gas side sacrificial sealing ring that serves as a heat shield is replaced by a step formed in a housing and in a hub, the step serving to assume the function of a heat shield instead of the sacrificial sealing ring. This design feature reduces production costs in connection with the outlay for the sacrificial sealing ring.

19 Claims, 4 Drawing Sheets

EXHAUST-GAS TURBOCHARGER FOR AN INTERNAL COMBUSTION ENGINE

CROSS-REFERENCES TO RELATED APPLICATION

This application claims priority to German patent application DE 10 2008 046 221.7 filed on Sep. 8, 2008, which is hereby incorporated by reference in its entirety.

TECHNICAL FIELD

The present invention relates to an exhaust-gas turbocharger for an internal combustion engine, in particular in a motor vehicle.

BACKGROUND

Document DE 10 2004 057138 A1 discloses such an exhaust-gas turbocharger of the generic type comprising an exhaust-gas side turbine wheel, an intake-side compressor wheel, and a shaft, the compressor wheel being positioned on the shaft and the turbine wheel being connected to the shaft by means of welding. A point of connection between the hub of the turbine wheel and the shaft is arranged in proximity to the bearing. Moreover, cooling ribs are described as machined on the hub, between which ribs a cooling fluid such as air, water or oil is conducted in order to eliminate heat in such a manner that less heat reaches the region of the shaft bearing. The two shaft seals mounted in the grooves of the hub prevent oil from leaking out of the bearing. The exhaust-gas side shaft seal can serve as a sacrificial sealing ring in this configuration. This design engineering is costly and also requires expensive materials.

SUMMARY

The present invention addresses the problem of providing for such an exhaust-gas turbocharger of an internal combustion engine an improved or at least a different embodiment that is characterised in particular in that reduced production and/or assembly costs result from design-engineering optimisation.

This problem is solved according to the invention by the subject matter of the dependent claim 1. Advantageous embodiments are the subject matter of the dependent claims.

The invention is based on the general concept of replacing a sacrificial sealing ring, which is designated as such in the prior art and serves as a heat shield, with a step that is formed in the housing and in the hub, said step serving to assume the function of a heat shield instead of the sacrificial sealing ring. In dispensing with the sacrificial sealing ring, the manufacturing costs are reduced by the amount required for this sacrificial sealing ring. Since the sacrificial sealing ring furthermore is adversely affected by the effects of the from the exhaust gas and thus eventually wears down over time, which is not the case with heat shield configured as a step, the fail safety of the components in their entirety is improved by dispensing with individual components susceptible to failure.

Additional important features and advantages of the invention can be found in the dependent claims, in the drawings, and in the pertinent description of the figures with reference to the drawings.

It is understood that the features described above and those to be described in what follows can be used not only in the particular cited combination; but also in other combinations or independently without departing from the scope of the present invention.

BRIEF DESCRIPTION OF THE DRAWINGS

Preferred embodiments of the invention are shown in the drawings and are described in more detail in the following description, the same reference numerals referring to components which are the same or functionally the same or similar.

It is schematically shown in

DETAILED DESCRIPTION

Figure 1:
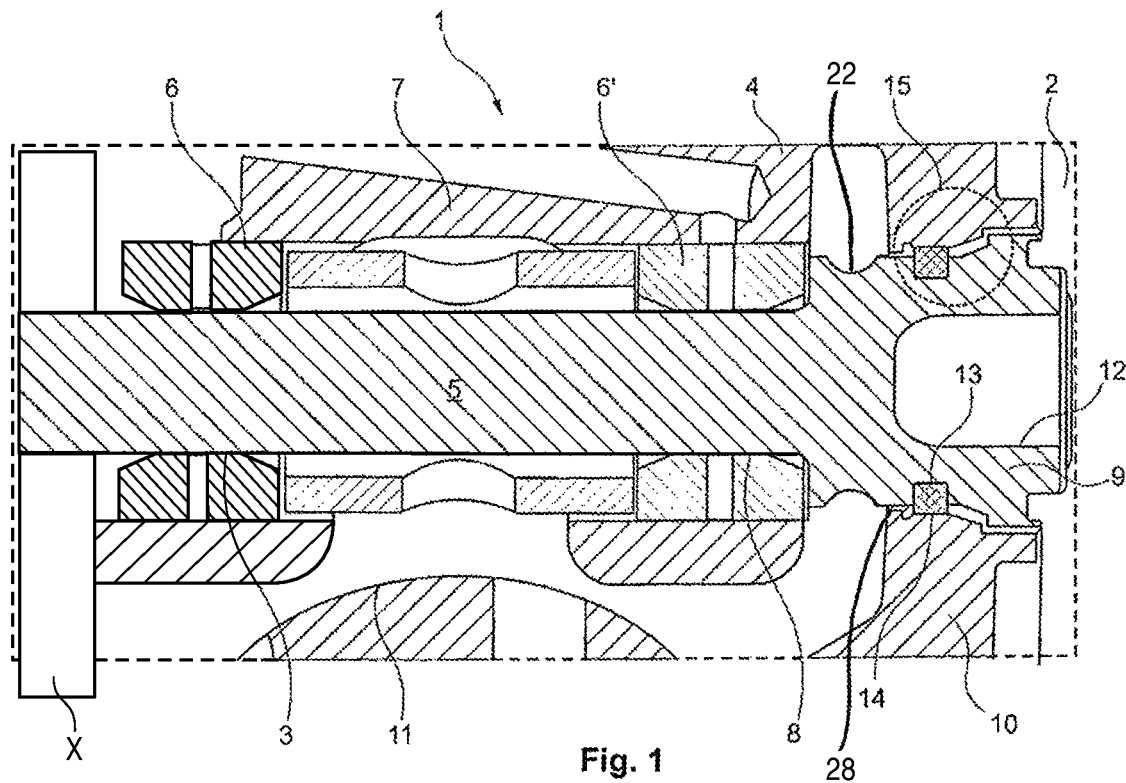
FIG. 1 an exhaust-gas side longitudinal section through an exhaust-gas turbocharger, FIG. 2 an enlarged figure of the longitudinal section through an exhaust-gas turbocharger in the region of the hub with a hub step and a housing step, FIG. 3 a representation as in FIG. 2, however with a housing step inclined toward the hub step, FIG. 4 the exhaust-gas turbocharger without oil-thrower groove and with a Scania step in the region of the hub, FIG. 5 the exhaust-gas turbocharger without oil-thrower groove and without a Scania step in the region of the hub, FIG. 6 the exhaust-gas turbocharger with an especially configured oil-thrower groove, FIG. 7 the exhaust-gas turbocharger with a labyrinth seal arranged in the region of the hub.

Corresponding to FIG. 1, an exhaust-gas turbocharger 1 for an internal combustion engine comprises an exhaust-gas side turbine wheel 2, a shaft 3 that connects in a rotationally-fixed manner the turbine wheel 2 to a compressor wheel 27, as well as a housing 4. The shaft 3 is mounted in a bearing region 5, the bearing comprising a bearing device 6, 6' in a bearing-housing section 7 and a bearing-shaft section 8, a hub 9 of the shaft 3 between bearing region 5 of the shaft 3 and turbine wheel 2, and a hub-housing section 10 surrounding the hub 9 as well as a lubrication supply device 11 for supplying the bearing region 5 of the shaft 3 with lubrication.

The turbine wheel 2 is connected with the hub 9 of the shaft 3 to the shaft 3 by means of a connecting device 12. A sealing ring 14 is positioned in a groove 13 of the hub 9 so as to prevent a flowing of the lubricant for lubricating the bearing device 6, 6' over and beyond the sealing ring 14 in the direction of the turbine wheel 2. If the lubricant, for example oil, comes into contact with hot exhaust gas, it can coke, and owing to the coke products, the lubrication of the shaft 3 can no longer be ensured.

Figure 2:
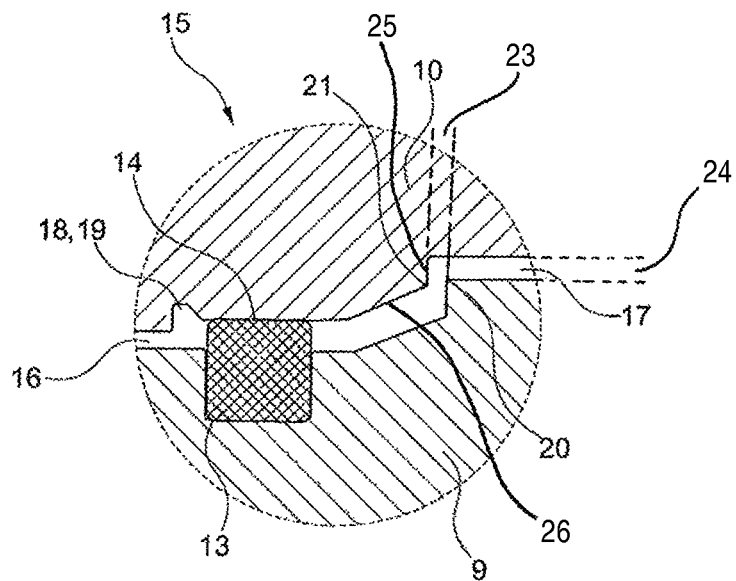

An enlarged partial section 15 of FIG. 1 is shown in FIG. 2. The enlargement makes it easier to recognise the sealing ring 14 in the groove 13 of the hub 9. Owing to the hub-housing section 10 that closely abuts the sealing ring 14, the bearing-region side, oil-conducting intermediate chamber 16 arranged between hub 9 and hub-housing section 10 is sealed with respect to the turbine-wheel side, exhaust-gas conducting intermediate chamber 17. After the sealing ring 14 toward the direction of the bearing region 5, an annular groove 18, in particular represented here as a Scania step 19, is formed in the hub-housing section 10. As may be seen in FIG. 2, the Scania step 19 is configured with a first surface 19a that extends away from the hub 9, a second surface 19b that intersects the first surface 19a and extends toward the direction of the exhaust-gas side, and a third surface 19c that intersects with the second surface 19b. The third surface 19c intersects with the oil conducting intermediate chamber 16. Since the sealing ring 14 comes into contact with the hot exhaust gas of the internal combustion engine on the side of the exhaust-gas conducting intermediate chamber 17, this sealing ring 14 must be protected from too great an impact of the heat with a heat-protection shield. To this end, a radial hub step 20 is configured in the hub 9 and a radial housing step 21, which communicates with the radial hub step 20, is configured in the hub-housing section 10. The radial hub step 20, in co-operation with the radial housing step 21, forms an effective heat-protection shield for the sealing ring 14 from the hot exhaust gas.

During the use of the exhaust-gas turbocharger 1, the hot exhaust gases of the internal combustion engine arrive in the exhaust-gas conducting intermediate chamber 17 between the hub 9 and the hub-housing section 10. There, they bounce with high speed against the housing step 21 and are thrown back against the hub step 20 positioned opposite therefrom. By means of guiding the exhaust gas in the exhaust-gas conducting intermediate chamber 17, turbulence arise, the flow resistance is increased, and the speed with which the exhaust gas strike the sealing ring 14 is considerably reduced. The hub step 20 and the housing step 21 thus act in the style of a labyrinth seal and the sealing ring 14 is thus better protected from the direct effects of the heat of the exhaust gas. It is self-evident that the exhaust-gas conducting intermediate chamber 17, together with the housing step 21 and the hub step 20, is optimised with regard to the above-mentioned effect as a heat shield.

As FIG. 1 shows, the shaft 3 between the bearing-shaft section 8 and the groove 13 can be configured with an oil-thrower groove 22. This oil-thrower groove 22 has the advantage that oil that penetrates from the lubrication supply device 11 in the direction of the sealing ring 14 and that migrates from the oil-thrower groove 22 upon rotation of the shaft 3 is hurled away from the oil-thrower groove 22 in such a manner that a penetration of the oil into the oil-conducting intermediate chamber 16 is at least reduced (cf. FIG. 2).

It can be seen from FIG. 2 that a first intermediate chamber 23 is arranged between the hub step 20 and the housing section 21. An axial length of the intermediate chamber 23 between the hub step 20 and the housing section 21 can be from 0.2 mm to 0.4 mm. Moreover, a second intermediate chamber 24 can be provided between the hub step 20 and hub-housing section 10, the radial length of said second intermediate chamber between the hub step 20 and the hub-housing section 10 being between 0.2 mm and 0.4 mm. The sealing ring 14 can have an external diameter of 10 mm to 16 mm.

Figure 3:
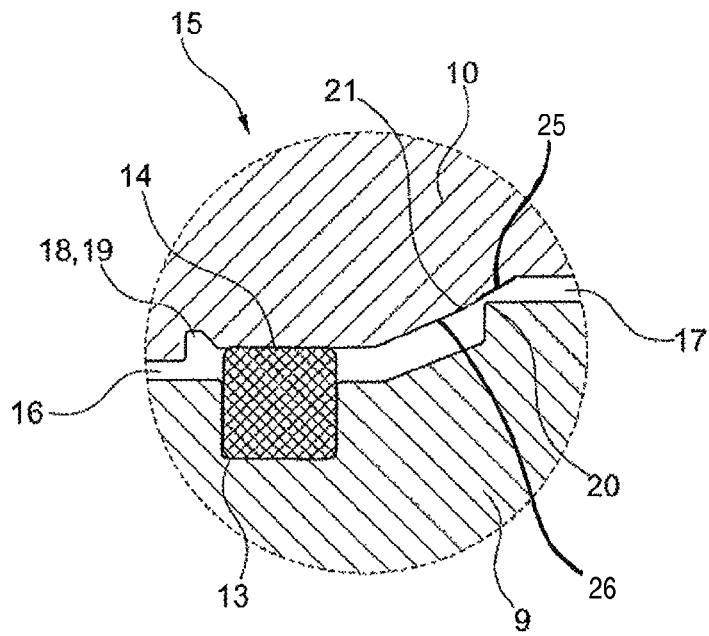

According to FIG. 3, it is however also possible that the plane of the of the ring surface 25 oriented toward the turbine wheel 2 is not arranged transversely to the shaft 3, as is shown in FIG. 2, but rather that the ring surface 25 runs inclined in the direction of the hub step 20. If the ring surface 25 runs inclined, it has the shape of frustoconical casing. In this manner, an angle between the ring surface 25 and a casing surface 26, oriented in the direction of the sealing ring 14, of the housing step 21 can be up to 180°

Figure 4:
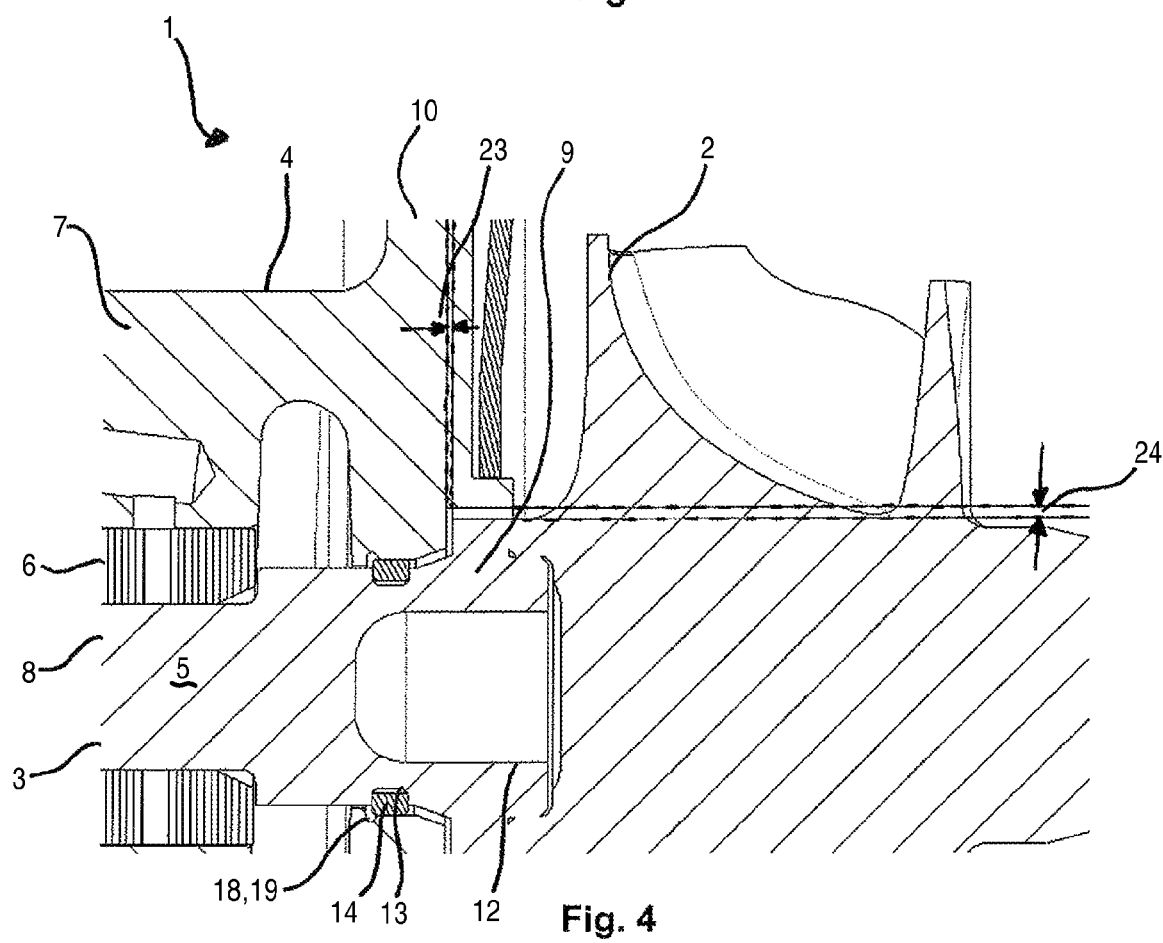

A preferred embodiment according to FIG. 4 is equipped with an annular groove 18 in the shape of Scania step 19; however, there is not an oil throwing groove 22 between the groove 14 and the bearing-shaft section 8.

Figure 5:
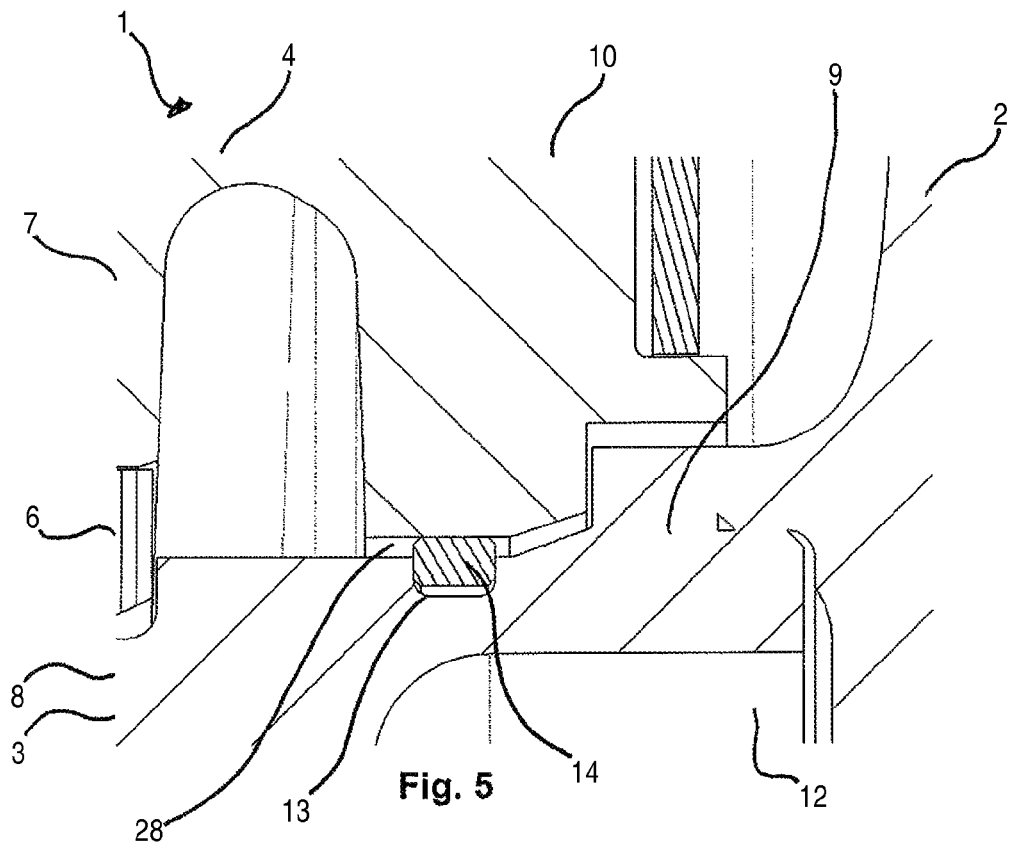

Furthermore, an embodiment shown in FIG. 5 is conceivable that may not have a sealing ring 14 arranged in the groove 13, but is equipped with neither an oil throwing groove 22 nor with an annular groove 18 configured as a Scania step 19.

Figure 6:
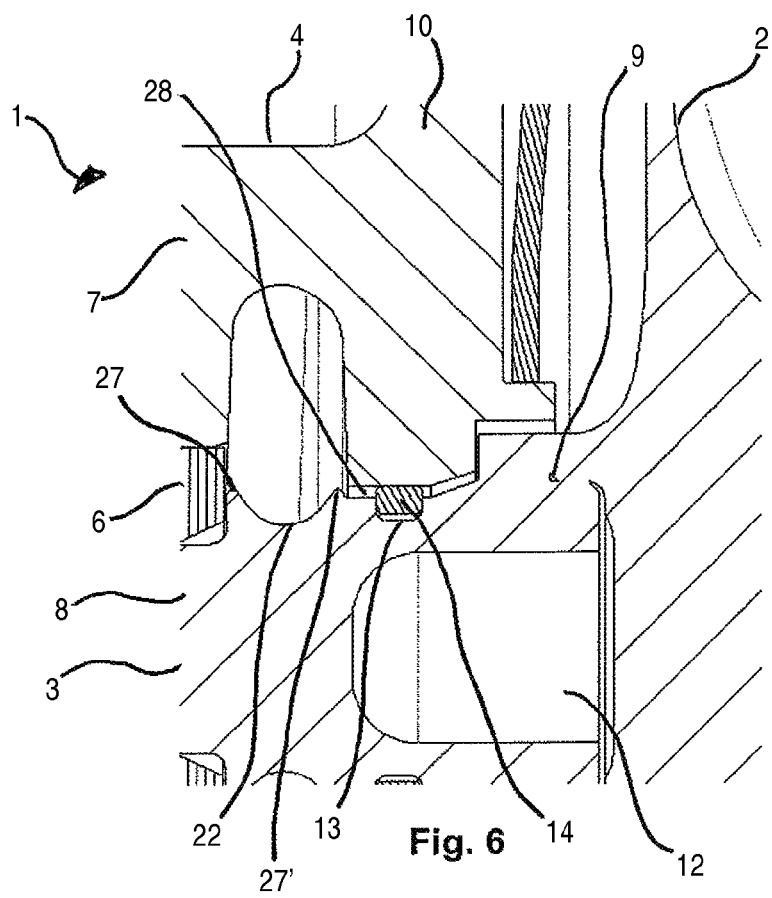

A particular embodiment with a specially configured oil throwing groove 22, as is shown in FIG. 6, has at least one annular bead 27, 27' in the region of the oil throwing groove 22 and configured on the shaft 3. Preferably the annular bead 27' arranged in the region of the sealing ring 14 borders at least in part an annular gap 28 arranged between hub 9 and hub-housing section 10 and furthermore positioned between the sealing ring 14 and the oil throwing groove 22. In the region of the annular gap 28, the hub 9 can be distanced from the hub-housing section 10 by approximately 0.2 mm to 0.4 mm owing to the annular gap 28.

Figure 7:
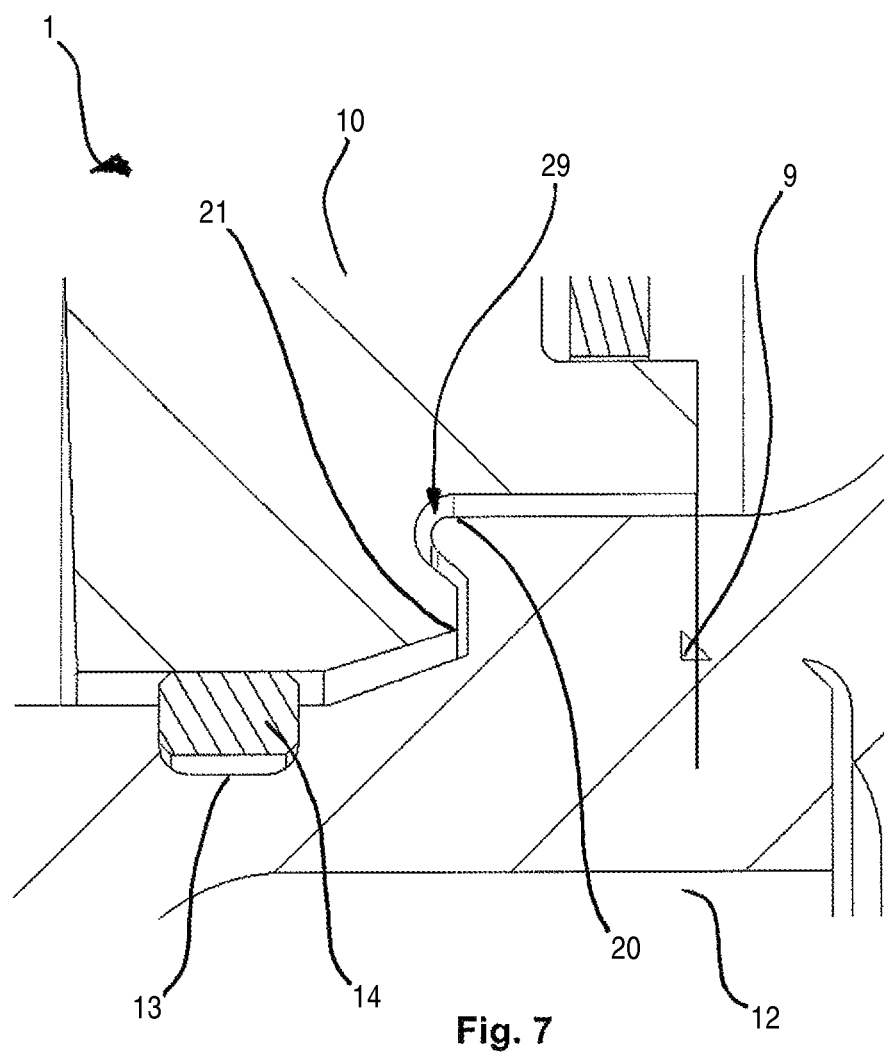

In a further-developed embodiment, as is shown in FIG. 7, the hub step 20 and the housing step 21 can be configured in the shape of a labyrinth seal 29. This can, for example, be achieved by means of concertina-like run of the gap between the hub-housing section 10 and the hub 9, as shown.

The invention claimed is:

1. An exhaust-gas turbocharger for an internal combustion engine, comprising:
    a shaft, a turbine wheel and a compressor wheel, wherein the shaft supports the turbine wheel and the compressor wheel and the shaft further includes,
    a housing,
    a bearing region of the shaft, comprising a bearing device, a bearing-housing section and a bearing-shaft section,
    a hub of the shaft, wherein the hub is positioned on an exhaust-gas side between the bearing region of the shaft and the turbine wheel,
    at least one groove in the hub,
    at least one sealing ring positioned in the groove of the hub for sealing the shaft;
    wherein the shaft further includes an oil throwing groove between the groove and the bearing-shaft section and at least one annular bead in the region of the oil throwing groove, wherein the at least one annular bead is arranged such that an annular gap is bordered thereby;
    a radial hub step configured in the hub of the shaft between the groove and the turbine wheel, and
    a hub-housing section enclosing the hub, wherein a radial housing step is configured, which communicates with the radial hub step such that the radial hub step in conjunction with the radial housing step forms a heat shield for at least one sealing ring to provide protection from hot exhaust gases.

2. The exhaust-gas turbocharger as specified in claim 1 wherein
    the radial housing step is configured parallel to the radial hub step such that the radial housing step cooperates with the radial hub step to form a heat shield for the sealing ring to provide protection from hot exhaust gases.

3. The exhaust-gas turbocharger as specified in claim 1, wherein the bearing device is equipped with at least one of a friction bearing and at least one anti-friction bearing.

4. The exhaust-gas turbocharger as specified in claim 3, wherein the bearing region is lubricated with a lubricant that contains at least one of a mineral motor oil, a synthetic motor oil, a multiple-viscosity oil, a high-lubricity oil, and a generally maintenance-free heavy-duty oil.

5. The exhaust-gas turbocharger as specified in claim 3, wherein an annular groove in the hub-housing section located directly behind at least one sealing ring is formed between the sealing ring and the bearing region such that the sealing ring does not protrude into the annular groove of the hub-housing section.

6. The exhaust-gas turbocharger as specified in claim 5, wherein the annular groove in the hub-housing section is configured with a first surface that extends away from the hub, a second surface that intersects the first surface and extends toward the direction of the turbine wheel and a third surface that intersects with the second surface.

7. The exhaust-gas turbocharger as specified in claim 3, wherein the shaping of the radial hub step and of the radial housing step is optimised for at least one sealing ring with regard to heat protection.

8. The exhaust-gas turbocharger as specified in claim 3, wherein a first intermediate chamber between the hub step and the housing step has an axial length of 0.2 mm to 0.4 mm.

9. The exhaust-gas turbocharger as specified in claim 3, wherein a second intermediate chamber between the hub step and the hub-housing section has a radial length of 0.2 mm to 0.4 mm.

10. The exhaust-gas turbocharger as specified in claim 3, wherein because of an annular gap, the hub is distanced from the hub-housing section by 0.2 mm to 0.4 mm.

11. The exhaust-gas turbocharger as specified in claim 1, wherein the bearing region is lubricated with a lubricant that contains at least one of a mineral motor oil, a synthetic motor oil, a multiple-viscosity oil, a high-lubricity oil, and a generally maintenance-free heavy-duty oil.

12. The exhaust-gas turbocharger as specified in claim 1, wherein an annular groove in the hub-housing section located directly behind at least one sealing ring is formed between the sealing ring and the bearing region such that the sealing ring does not protrude into the annular groove of the hub-housing section.

13. The exhaust-gas turbocharger as specified in claim 12, wherein the annular groove in the hub-housing section is configured with a first surface that extends away from the hub, a second surface that intersects the first surface and extends toward the direction of the turbine wheel and a third surface that intersects with the second surface.

14. The exhaust-gas turbocharger as specified in claim 1, wherein the shaping of the radial hub step and of the radial housing step is optimised for at least one sealing ring with regard to heat protection.

15. The exhaust-gas turbocharger as specified in claim 1, wherein a first intermediate chamber between the hub step and the housing step has an axial length of 0.2 mm to 0.4 mm.

16. The exhaust-gas turbocharger as specified in claim 1, wherein a second intermediate chamber between the hub step and the hub-housing section has a radial length of 0.2 mm to 0.4 mm.

17. The exhaust-gas turbocharger as specified in claim 1, wherein because of an annular gap, the hub is distanced from the hub-housing section by 0.2 mm to 0.4 mm.

18. The exhaust-gas turbocharger as specified in claim 1, wherein the hub is configured such that in the region of the hub step, the hub-housing section, and the housing step a labyrinth seal is formed between the hub and the hub-housing section.

19. The exhaust-gas turbocharger as specified in claim 1, wherein
radial housing step is configured at an angle toward the turbine wheel to run inclined opposite the radial hub step such that the radial housing step cooperates to produce a narrowed area within an exhaust gas conducting chamber at the radial hub step to form the heat shield.

* * * * *